United States Patent
Levin et al.

(10) Patent No.: US 11,290,460 B2
(45) Date of Patent: Mar. 29, 2022

(54) TECHNIQUES FOR PROTECTING CLOUD NATIVE ENVIRONMENTS BASED ON CLOUD RESOURCE ACCESS

(71) Applicant: Twistlock, Ltd., Herzliya (IL)

(72) Inventors: Liron Levin, Herzliya (IL); Michael Kletselman, Tel Aviv (IL); Dima Stopel, Herzliya (IL); John Morello, Baton Rouge, LA (US)

(73) Assignee: Twistlock, Ltd., Herzliya (IL)

( * ) Notice: Subject to any disclaimer, the term of this patent is extended or adjusted under 35 U.S.C. 154(b) by 295 days.

(21) Appl. No.: 16/232,567

(22) Filed: Dec. 26, 2018

(65) Prior Publication Data

US 2020/0213320 A1  Jul. 2, 2020

(51) Int. Cl.
*H04L 29/06* (2006.01)
*G06F 21/60* (2013.01)
*H04L 41/0654* (2022.01)
*G06F 9/50* (2006.01)

(52) U.S. Cl.
CPC .......... *H04L 63/102* (2013.01); *G06F 9/5072* (2013.01); *G06F 21/604* (2013.01); *H04L 41/0672* (2013.01); *H04L 63/02* (2013.01); *H04L 63/083* (2013.01); *H04L 63/101* (2013.01); *H04L 63/105* (2013.01); *H04L 63/1441* (2013.01); *G06F 2221/2141* (2013.01)

(58) Field of Classification Search
CPC ... H04L 63/102; H04L 63/101; H04L 63/105; H04L 63/1441; H04L 63/02; H04L 41/0672; H04L 63/083; H04L 43/0876; H04L 41/0896; H04L 41/0816; G06F 21/604; G06F 9/5072; G06F 2221/2141; G06F 9/468; G06F 21/53; G06F 21/6218
See application file for complete search history.

(56) References Cited

U.S. PATENT DOCUMENTS

| | | | | |
|---|---|---|---|---|
| 10,110,600 | B1* | 10/2018 | Simca | H04L 63/08 |
| 10,771,469 | B1* | 9/2020 | Sarukkai | H04L 67/10 |
| 2014/0020072 | A1* | 1/2014 | Thomas | H04L 63/102 |
| | | | | 726/7 |
| 2014/0317716 | A1* | 10/2014 | Chao | H04L 63/0815 |
| | | | | 726/9 |
| 2019/0147089 | A1* | 5/2019 | Megahed | G06F 16/2477 |
| | | | | 707/718 |

* cited by examiner

*Primary Examiner* — Jeffrey C Pwu
*Assistant Examiner* — Mayasa A. Shaawat
(74) *Attorney, Agent, or Firm* — M&B IP Analysts, LLC

(57) ABSTRACT

A system and method for method for protecting cloud native environments based on cloud resource access. The method includes determining a mapping of a plurality of cloud assets to a plurality of cloud resources based on resource access data for a cloud native environment, wherein the plurality of cloud assets and the plurality of cloud resources are deployed in the cloud native environment, wherein each of the plurality of cloud assets is mapped to at least one associated cloud resource of the plurality of cloud resources; detecting at least one improper resource access based on the mapping and a cloud access security stream for the cloud native environment, wherein each of the at least one improper resource access deviates from the mapping; and performing at least one mitigation action with respect to the detected at least one improper resource access.

19 Claims, 4 Drawing Sheets

TECHNIQUES FOR PROTECTING CLOUD NATIVE ENVIRONMENTS BASED ON CLOUD RESOURCE ACCESS

TECHNICAL FIELD

The present disclosure relates generally to cloud native environments, and more particularly to cyber security in cloud native environments.

BACKGROUND

Cloud native technology provides techniques for building and running applications using the benefits of the cloud computing delivery model. With the increasing use of cloud computing, more organizations have adopted cloud native applications that are designed to take advantage of cloud computing frameworks. Specifically, cloud native applications are designed to break down tasks into separate services that can be run on different servers which may be in different geographical locations. Cloud native applications allow for rapidly scaling as demand changes by utilizing modular services in place of some locally hosted functions.

Cloud native environments utilize technologies such as containers, microservices, and declarative application program interfaces (APIs) to provide scalable functionality. The containers provide all information needed to run an application in a self-contained bundle. Each microservice provides a single function for the application. A microservice is independent of the applications such that, for example, it can be used by different applications and its underlying software can be updated separately from any applications.

Common multi-cloud environments are composed of a large number of assets providing compute and/or storage services. These assets may be of different types such as, for example, serverless applications, Kubernetes clusters, software containers, virtual machines, registries, serverless functions, and the like. A challenge in securing such environments is adapting to changes within the environments. To this end, a cloud administrator must manually manage the posture of these assets and ensure that all assets that are deployed are protected. This challenge is escalated for larger enterprises in which assets are often modified and accessed by a large number of employees.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for method for protecting cloud native environments based on cloud resource access. The method comprises: determining a mapping of a plurality of cloud assets to a plurality of cloud resources based on resource access data for a cloud native environment, wherein the plurality of cloud assets and the plurality of cloud resources are deployed in the cloud native environment, wherein each of the plurality of cloud assets is mapped to at least one associated cloud resource of the plurality of cloud resources; detecting at least one improper resource access based on the mapping and a cloud access security stream for the cloud native environment, wherein each of the at least one improper resource access deviates from the mapping; and performing at least one mitigation action with respect to the detected at least one improper resource access.

Certain embodiments disclosed herein also include a non-transitory computer readable medium having stored thereon causing a processing circuitry to execute a process, the process comprising: determining a mapping of a plurality of cloud assets to a plurality of cloud resources based on resource access data for a cloud native environment, wherein the plurality of cloud assets and the plurality of cloud resources are deployed in the cloud native environment, wherein each of the plurality of cloud assets is mapped to at least one associated cloud resource of the plurality of cloud resources; detecting at least one improper resource access based on the mapping and a cloud access security stream for the cloud native environment, wherein each of the at least one improper resource access deviates from the mapping; and performing at least one mitigation action with respect to the detected at least one improper resource access.

Certain embodiments disclosed herein also include a system for cloud native discovery and protection. The system comprises: a processing circuitry; and a memory, the memory containing instructions that, when executed by the processing circuitry, configure the system to: determine a mapping of a plurality of cloud assets to a plurality of cloud resources based on resource access data for a cloud native environment, wherein the plurality of cloud assets and the plurality of cloud resources are deployed in the cloud native environment, wherein each of the plurality of cloud assets is mapped to at least one associated cloud resource of the plurality of cloud resources; detect at least one improper resource access based on the mapping and a cloud access security stream for the cloud native environment, wherein each of the at least one improper resource access deviates from the mapping; and perform at least one mitigation action with respect to the detected at least one improper resource access.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
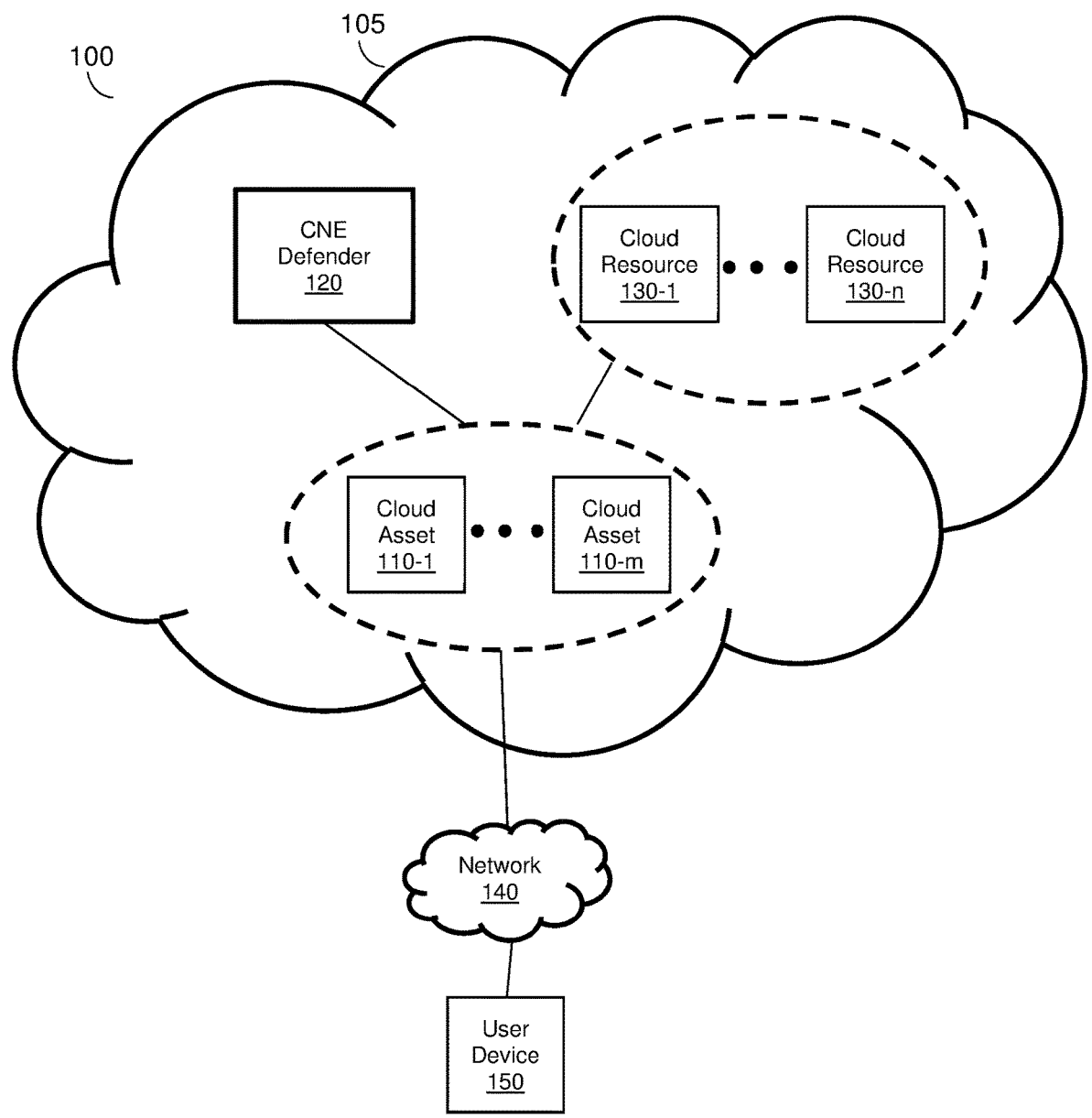
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for cloud native discovery and protection. The disclosed embodiments include techniques for protecting cloud native environments including cloud assets which may access cloud resources. Each cloud asset is deployed in a cloud native environment and provides a cloud service for compute or storage such that multiple cloud assets collectively operate as a cloud application. Example cloud assets include, but are not limited to, serverless applications, registries, software containers, virtual machines, clusters of nodes, and the like.

In some implementations, only certain items are considered cloud assets. For example, only some (i.e., not all) software containers in a cloud native environment may be cloud assets. As a non-limiting example, only containers accessed for the direct purpose of providing a function to a user may be considered cloud assets, while other containers (e.g., containers providing security services that do not directly assist with providing functions to users) are not.

In an embodiment, based on cloud asset credentials for cloud assets deployed in a cloud native environment, application programming interface (API) endpoints in the cloud native environment are identified and instances of the cloud assets are discovered in the cloud native environment. For each discovered cloud asset instance, it is determined whether the cloud asset has active security protection. The determination may be based on metadata collected from a defender host, a runtime application self-protection (RASP) defender, both, and the like. All assets lacking active security protection are reconfigured for active protection. The cloud native environment may be monitored using cloud APIs to determine when new instances of cloud assets are instantiated or existing instances of cloud assets are modified and to ensure that each of those cloud assets is actively protected.

In another embodiment, all cloud assets in a cloud native environment are analyzed with respect to a global context in order to map each cloud asset to one or more resources in the cloud native environment that the cloud asset normally uses. The mapping is based on resource access data indicating information related to access of resources by each cloud asset. Such resource access data may include, but is not limited to, resources accessed by each cloud asset, resources listed in permissions for each cloud asset, credentials used for accessing each resource by each cloud asset, and the like. Once the cloud assets have been mapped to resources, resource access is monitored to detect deviations from the mapping. Mitigation actions are performed when such deviations are detected. Deviations may include use of a resource by a cloud asset when the cloud asset is not mapped to that resource, a cloud asset being configured for accessing resources that it does not need access to, use of unusual credentials to access a resource, or a combination thereof. Use of unusual credentials to access a resource may include, for example, using credentials that are bound to another cloud asset or using credentials associated with a cloud asset from an unknown IP address.

It has been identified that malicious entities may attempt to manipulate cloud native applications to improperly access and manipulate cloud assets and resources. Manually configuring cloud assets as instances are added or modified is often impractical, particularly for large organizations where the number of such instances may be very large. Additionally, it has been identified that unusual access of resources by cloud assets is a good indicator of manipulation of a cloud asset by a malicious entity. To this end, the disclosed embodiments provide techniques for protecting against such malicious activities by automatically reconfiguring cloud assets for active security as they are deployed and by detecting unusual attempts to access resources.

FIG. 1 shows an example network diagram 100 utilized to describe various disclosed embodiments. The network diagram 100 includes cloud assets 110-1 through 110-$m$ (referred to individually as a cloud asset 110 or collectively as cloud assets 110 for simplicity) communicating with a cloud native environment (CNE) defender 120 and with cloud resources 130-1 through 130-$n$ (referred to individually as a resource 130 or collectively as resources 130 for simplicity) in a cloud native environment 105.

The cloud native environment 105 may be a cloud-computing infrastructure such as, but not limited to, Amazon Web Services (AWS), Cisco® Metapod, Microsoft Azure®, Google® Compute Engine (GCE), Joyent®, and the like. It should be noted that the cloud assets 110 can be deployed in different geographic locations from each other and from any of the cloud resources 130 without departing from the scope of the disclosure.

The cloud assets 110 may further communicate with user devices such as a user device 150 via a network 140. The network 140 may be the Internet, the world-wide-web (WWW), a local area network (LAN), a wide area network (WAN), a metro area network (MAN), and the like.

Each cloud asset 110 provides a cloud service for compute or storage. Example cloud assets 110 may include, but are not limited to, Google registry, Amazon Web Services® (AWS) Lambda, object stores from AWS, software containers, serverless functions (e.g., microservices), software containers (e.g., containers as a service), Kubernetes clusters, cloud functions by Google, Azure Kubernetes Services, virtual machines, container registries, Google Kubernetes Engine clusters, and the like.

The cloud assets 110 collectively provide application functionality to the user device 150. To this end, each of the cloud assets 110 is configured to perform one or more tasks related to providing functions and has access to at least a portion of one or more of the cloud resources 130 for use in providing functions. The cloud assets 110 are associated with respective metadata indicating identifying or configuration information such as, but not limited to, an identifier (e.g., a cluster identifier for a Kubernetes cluster), a host region, a current software version, a combination thereof, and the like. Each of the cloud assets 110 may be configured to require authenticating credentials (e.g., username and password) before granting access. Different cloud assets 110 may require different sets of credentials.

In an embodiment, the cloud native environment defender 120 is configured to receive one or more sets of cloud credentials provided by a cloud administrator (not shown) for the cloud native environment 105. Based on the received credentials, the cloud native environment defender 120 is configured to enumerate all API endpoints in the cloud native environment 105 and discover all of the cloud assets 110. For each of the cloud assets 110, the cloud native environment defender 120 is configured to determine whether the cloud asset 110 is actively protected based on its respective configuration and associated metadata. Protecting cloud native environments based on asset identification and configuration is described further herein below with respect to FIG. 2.

The cloud resources 130 may be, but are not limited to, computing, storage, and networking resources. As non-limiting examples, the cloud resources 130 may include processors, portions of memory (e.g., object stores), network connections, and the like. In some implementations, a cloud access security system (e.g., Cloud Watch or a custom security solution, not shown) may be deployed with respect to the cloud native environment 105 and configured to provide a cloud access security stream based on access of resources 130 by the cloud assets 110.

In an embodiment, the cloud native environment defender 120 is configured to map each cloud asset 110 to one or more of the resources 130 based on previous accesses (e.g., accesses indicated in a cloud access security stream) by the cloud asset 110. The mapping may be further based on credentials used by each cloud asset 110 when accessing each resource 130. The cloud native environment defender 120 is configured to monitor resource access by the cloud assets 110 to identify deviations from the mapping. Such deviations may include use of credentials for unusual resources 130, a cloud asset 110 being configured to use resources 130 that it does not actually use, and a cloud asset 110 accessing a resource 130 that it is not mapped to. Protecting cloud native environments based on asset-resource mappings is described further herein below with respect to FIG. 3.

It should be noted that a single user device 150 is shown in FIG. 1 merely for simplicity and that multiple user devices may be equally served by the cloud assets 110 according to the disclosed embodiments. Additionally, a single cloud native environment 105 is shown in FIG. 1 merely for simplicity, but multiple cloud native environments may be scanned and protected in accordance with the disclosed techniques.

Figure 2:
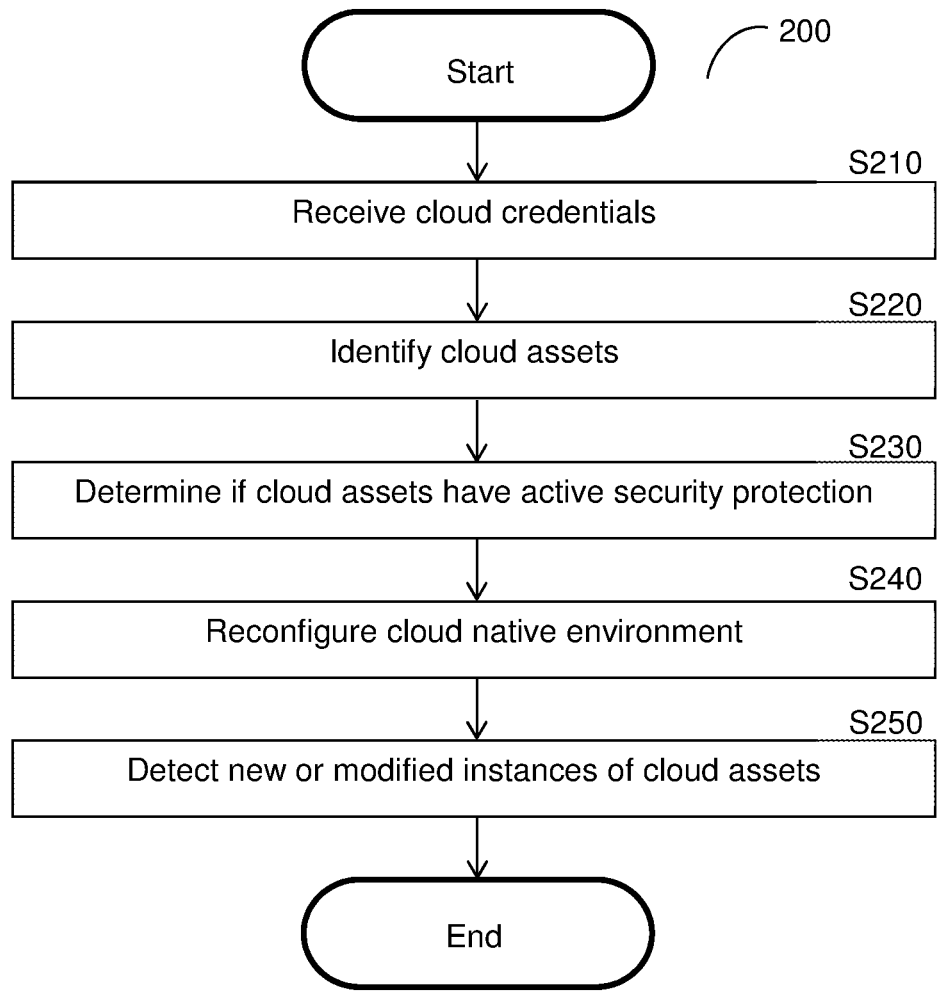
FIG. 2 is a flowchart illustrating a method for protecting a cloud native environment based on cloud asset configuration according to an embodiment.

FIG. 2 is an example flowchart 200 illustrating a method for protecting a cloud native environment based on cloud asset configuration according to an embodiment. In an embodiment, the method may be performed by the cloud native environment defender 120, FIG. 1.

At S210, cloud credentials are received. The cloud credentials are used for accessing cloud assets in a cloud native environment and may be received from, for example, a user device of a cloud administrator. To this end, S210 may include prompting a user of the user device to enter credentials used for all cloud assets in the cloud native environment.

At S220, cloud assets in the cloud native environment are identified. In an embodiment, S220 includes enumerating all API endpoints of assets in the cloud using the received cloud credentials and discovering cloud assets based on the enumerated API endpoints.

At S230, for each identified cloud asset, it is determined whether it has active security protection. The determination is based on a configuration of the cloud asset, of a security service deployed in the cloud native environment, or both. In an embodiment, whether each cloud asset has active security protection is determined based on metadata for the cloud asset indicating an identifier of the cloud asset, a configuration of the cloud asset (e.g., a version number, portions of software included in the cloud asset, etc.), or both. The identifiers may include, but are not limited to, name, Internet Protocol (IP) address, identification number or code, host region, an identifier of software used by the cloud asset, and the like.

In an embodiment, S230 may include comparing at least a portion of the metadata for each cloud asset to required configuration information for the cloud asset, configuration information for one or more security services deployed in the cloud native environment, a known version number of a current update for software, a combination thereof, and the like.

As a non-limiting example for comparing metadata to cloud asset security-related information, an identifier of the cloud asset may be compared to identifiers indicated in a list of entities protected by a cloud security service to determine if the cloud security service protects the cloud asset. As another example, a version number indicated in the metadata may be compared to a known current version number for a type of software indicated in the metadata to determine if the cloud asset is using updated software. As yet another example, metadata of a cloud asset may be compared to a list of required security solutions for each cloud asset in the cloud native environment to determine if the metadata indicates that the cloud asset incorporates the required security solutions.

At S240, for each cloud asset that is determined not to have active security protection, at least a portion of the cloud native environment is reconfigured for active security protection. In an embodiment, S240 includes reconfiguring the cloud native asset, one or more security solutions in the cloud native environment, or both.

As a non-limiting example for updating a cloud asset, a cloud asset having an old version of software (e.g., v5 when a known v6 is available), the software of the cloud asset may be updated to the newest version. Further, assets in the updated version may be modified for consistency to ensure that references from v5 are maintained when updated to v6.

As another non-limiting example for updating a cloud asset, it is checked if a serverless application includes a particular security solution. If not, the security solution is pushed to and incorporated into the serverless application, and the serverless application is reuploaded with the same name as it had originally.

As a non-limiting example for updating a cloud security service, when a cloud security system is configured to scan registries and a repository has been identified as a cloud asset, it is checked whether the cloud security system is configured to scan that repository and, if not, is reconfigured to include an identifier of the repository in its configuration.

As another non-limiting example for updating a cloud security service, for 3 Kubernetes clusters having different names, it is checked whether a security service protects each cluster by comparing the names of the clusters to names indicated in a configuration of the security service. If not, the security service is reconfigured to include the names of all 3 clusters.

At optional S250, using cloud APIs of the cloud native environment, the cloud native environment may be monitored to detect new or modified instances of cloud assets. When new instances of cloud assets are detected, they may be checked for active security protection and reconfigured if needed as described with respect to S230 and S240. In an embodiment, S250 may be performed iteratively such that monitoring and reconfiguration is continuous.

Figure 3:
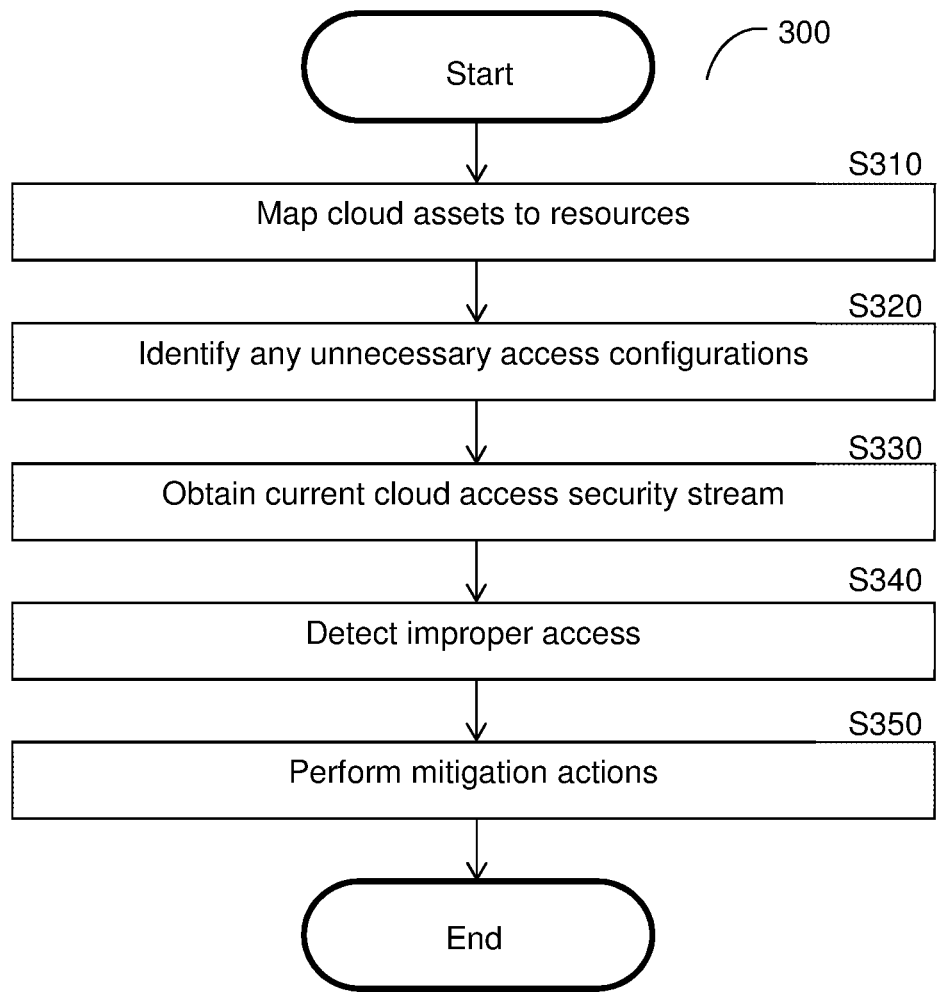
FIG. 3 is a flowchart illustrating a method for protecting a cloud native environment based on cloud resource access according to an embodiment.

FIG. 3 is an example flowchart 300 illustrating a method for protecting a cloud native environment based on cloud resource access according to an embodiment. In an embodiment, the method may be performed by the cloud native environment defender 120, FIG. 1.

At S310, cloud assets of a cloud native environment are mapped to cloud resources. The mapping is based on historical resource access data indicating information related to access of cloud resources by cloud assets in the cloud native environment such as, but not limited to, identifiers of each cloud asset (e.g., Internet Protocol addresses), resources accessed by each cloud asset, credentials used by each cloud asset to access different resources, access permissions for each cloud asset, and the like. The mapping indicates an identifier of each cloud asset associated with one or more resources, and may further indicate credentials used by the cloud asset to access its respective associated resources.

In an embodiment, S310 includes obtaining the resource access data. Obtaining the resource access data may include, but is not limited to, receiving or retrieving a list of permissions for each cloud asset (e.g., from a cloud provider), querying a metadata API for credentials used by different cloud assets, receiving or retrieving a cloud access security stream collected by one or more cloud security solutions, accessing historical access data for a cloud provider of the cloud native environment, checking credential use in disk or in application memory, retrieving previous authentication information from one or more firewalls deployed in the cloud native environment, and the like.

Mapping cloud assets to resources and credentials used for accessing those resources allows for learning normal resource access behaviors for each cloud asset. These learned behaviors can then be used to detect when abnormal access that may indicate malicious activity is occurring.

At optional S320, based on the historical resource access data used for the mapping and a configuration of each mapped cloud asset, unnecessary access configurations are detected. In an embodiment, S320 includes determining whether any of the cloud assets are configured to access resources to which they do not need access. If so, mitigation actions for restricting resource access may be taken or the mitigation actions taken as discussed herein below with respect to S350 may further be based on such unnecessary resource access configuration. The mitigation actions may include, but are not limited to, generating an alert, blocking access to one or more resources by certain cloud assets, reconfiguring one or more cloud assets to remove access to the resource, and the like.

A cloud asset may not need access to a resource if, for example, the historical resource access data does not indicate that the cloud asset accessed the resource or indicates that the cloud asset accessed the resource below a threshold number of times (e.g., based on a time period during which the historical access data was collected). Restricting access based on lack of need allows for reducing risks related to overly permissive access to resources. This reduced risk may come in forms such as, for example, minimizing the number of resources that can be improperly accessed by a malicious entity controlling the cloud asset.

As a non-limiting example of unnecessary access configuration, if a cloud asset has permission to access a Lambda store but historical resource access data for the cloud asset does not include accessing the Lambda store, it is determined that the cloud asset does not require access to the Lambda store.

In another embodiment, S320 may further include performing credentials materialization detection. The credentials materialization detection includes determining, for each mapped cloud asset, whether the cloud asset is configured with credentials it does not need. It has been identified that users (e.g., cloud native administrators) may store credentials locally for convenience. Such users may fail to delete the credentials after they are no longer needed. It is noted that having credentials which are not needed presents a security risk since, in the event of a breach, credentials are unnecessarily exposed to theft. To this end, the unnecessary credentials may be detected by actively monitoring a cloud native environment using filesystem sensors deployed in the cloud native environment and, specifically, analyzing files written to cloud assets, containers, serverless applications, and the like. Alternatively or collectively, unnecessary credentials may be detected by scanning host files.

In a further embodiment, the unnecessary credentials are detected based on locations in which credentials are stored, the length of time since the last use of the credentials, a file owner or active user who stored the credentials, a combination thereof, and the like. With respect to file location, in an example implementation, credentials stored in a user folder (e.g., "/home/johnsmith/" or "/tmp") may be determined as unnecessary. With respect to time, credentials that have not been used in a sufficiently long period of time (e.g., above a threshold amount of time) may be determined as unnecessary. With respect to file owners or users, credentials that were not stored by authorized users (e.g., a person with sufficient privilege within an organization to store credentials) may be determined as unnecessary.

At S330, a current cloud access security stream is obtained. The cloud access security stream may be current with respect to including data collected during, for example, a predetermined period of time. The cloud access security stream may include data indicating resource access information such as, but not limited to, Internet Protocol (IP) addresses of entities accessing each resource, credentials used by each entity to access one or more resources, authentication requests, and the like.

At S340, based on the cloud access security stream and the mapping, any improper resource access is detected. Such improper resource access may include, but is not limited to, use of known sets of credentials for unusual resources (i.e., using a set of credentials typically used for accessing one resource to access a different resource), use of expired credentials, increase in the amount of times a set of credentials is used (e.g., a higher number per a period of time), unusual access of resources by cloud assets (e.g., a cloud asset accessing a resource that is not indicated in the mapping between that cloud asset and its associated resources or a device having an unmapped IP address attempting to access one of the mapped resources), and the like. The improper resource access may be indicative of, for example, privilege escalation, account compromising, and the like.

As a non-limiting example for improper resource access, based on credentials received from a metadata API in response to a query, it is determined that a particular set of keys is used for a service provided via the cloud native environment and that set of keys is included in the mapping of a cloud asset to that service. When that set of keys is used by the cloud asset for a different service (either inside or outside the cloud native environment), it is determined that improper access has occurred.

As another non-limiting example, AWS Lambda may access one or more services provided by Amazon and mapping indicates this association between Lambda and the one or more services. If services other than those one or more services are accessed by Lambda, it is determined that improper access has occurred.

At S350, one or more mitigation actions is taken with respect to the detected improper access. The mitigation actions may include, but are not limited to, generating an alert, blocking access, and the like.

Figure 4:
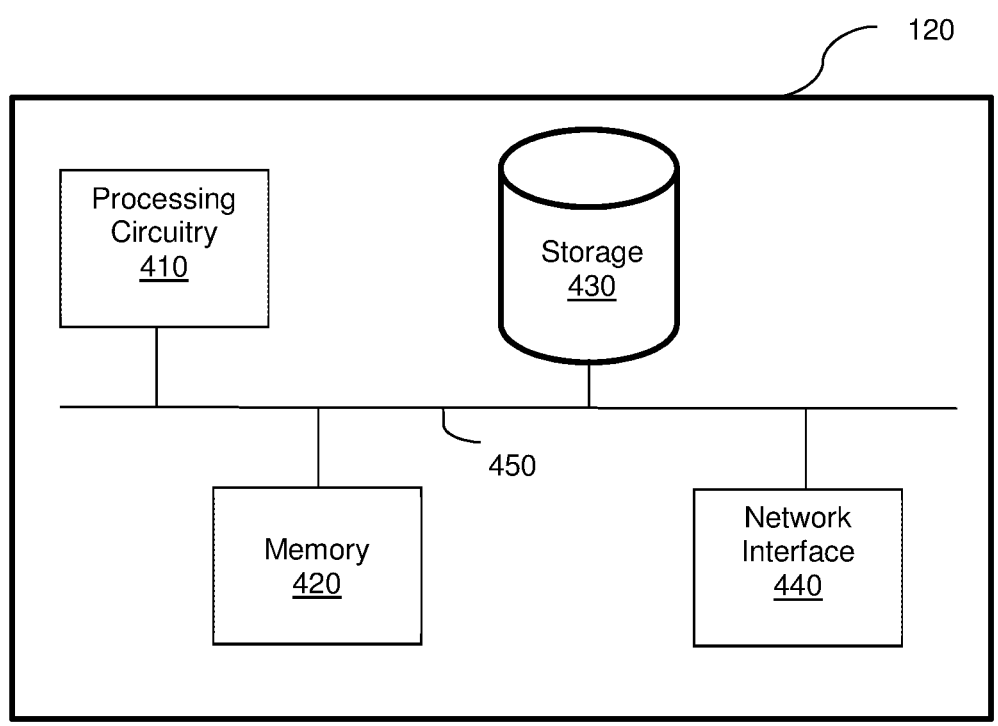
FIG. 4 is a schematic diagram of a cloud native environment defender utilized to execute at least a cloud native environment protector according to an embodiment.

FIG. 4 is an example schematic diagram of a cloud native environment defender 120 according to an embodiment. The cloud native environment defender 120 includes a processing circuitry 410 coupled to a memory 420, a storage 430, and a network interface 440. In an embodiment, the components of the cloud native environment defender 120 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 410 to perform an on-demand authorization of access to protected resources, as discussed hereinabove.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the cloud native environment defender 120 to communicate with the cloud assets 110, a cloud security system, and the like.

It should be understood that the embodiments described herein are not limited to the specific architecture illustrated in FIG. 4, and other architectures may be equally used without departing from the scope of the disclosed embodiments. In particular, the cloud native environment defender 120 may be implemented as a cloud application, where the underlying hardware of the cloud application includes components such as a processing circuitry, memory, storage, and one or more interfaces.

It should be noted that various embodiments are discussed with respect to a single cloud native environment, but cloud assets distributed among multiple cloud native environments may be equally protected according to the disclosed embodiments. Cloud assets and resources in multiple cloud native environments may be analyzed as if they were in the same cloud native environment with respect to, for example, mapping assets to resources, without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for protecting cloud native environments based on cloud resource access, comprising:
   determining a mapping of a plurality of cloud assets to a plurality of cloud resources based on resource access data for a cloud native environment, wherein the plurality of cloud assets and the plurality of cloud resources are deployed in the cloud native environment, wherein each of the plurality of cloud assets is mapped to at least one associated cloud resource of the plurality of cloud resources, wherein the resource access data includes historical resources accessed by each of the plurality of cloud assets, wherein each cloud asset provides a cloud service;

detecting at least one improper resource access based on the mapping and a cloud access security stream for the cloud native environment, wherein each of the at least one improper resource access deviates from the mapping; and performing at least one mitigation action with respect to the detected at least one improper resource access.

2. The method of claim 1, wherein the mapping further indicates credentials used for accessing the plurality of cloud resources by each of the plurality of cloud assets, wherein the at least one improper resource access includes at least one deviation from the mapping with respect to the credentials.

3. The method of claim 1, wherein the at least one improper resource access includes a first cloud asset of the plurality of cloud assets accessing a first cloud resource of the plurality of cloud resources, wherein the first cloud asset is not mapped to the first cloud resource.

4. The method of claim 1, wherein the at least one improper resource access includes an unknown cloud asset accessing one of the plurality of cloud resources, wherein the unknown cloud asset is not among the plurality of cloud assets.

5. The method of claim 1, further comprising:
determining, based on the resource access data, an improperly configured cloud asset of the plurality of cloud assets, wherein the improperly configured cloud asset is configured to access an unnecessary cloud resource of the plurality of cloud resources, wherein the unnecessary cloud resource has been accessed by the improperly configured cloud asset below a threshold number of times.

6. The method of claim 5, wherein the mitigation actions further include reconfiguring the improperly configured cloud asset, wherein the reconfigured cloud asset is not configured to access the at least one unnecessary resource.

7. The method of claim 1, further comprising:
detecting presence of at least one set of unnecessary credentials in the cloud native environment, wherein the at least one improper resource access includes the presence of the at least one set of unnecessary credentials, wherein the at least one set of unnecessary credentials includes at least one of: a set of credentials stored in a user folder, a set of credentials that has not been used in at least a threshold period of time, and a set of credentials stored by a user who is not authorized to store credentials.

8. The method of claim 1, further comprising:
obtaining the resource access data, wherein obtaining the resource access data includes at least one of: retrieving a list of permissions for each of the plurality of cloud assets, querying a metadata application programming interface for credentials used by the plurality of cloud assets, accessing historical access data for a cloud provider of the cloud native environment, checking credential use stored in memory, and retrieving historical authentication information from at least one firewall deployed in the cloud native environment.

9. The method of claim 1, wherein the cloud access security stream includes at least one of: a plurality of Internet Protocol addresses of entities accessing each of the plurality of cloud resources, credentials used by each of the entities to access the plurality of cloud resources, and a plurality of authentication requests.

10. A non-transitory computer readable medium having stored thereon instructions for causing a processing circuitry to execute a process, the process comprising:
determining a mapping of a plurality of cloud assets to a plurality of cloud resources based on resource access data for a cloud native environment, wherein the plurality of cloud assets and the plurality of cloud resources are deployed in the cloud native environment, wherein each of the plurality of cloud assets is mapped to at least one associated cloud resource of the plurality of cloud resources, wherein the resource access data includes historical resources accessed by each of the plurality of cloud assets, wherein each cloud asset provides a cloud service;

detecting at least one improper resource access based on the mapping and a cloud access security stream for the cloud native environment, wherein each of the at least one improper resource access deviates from the mapping; and performing at least one mitigation action with respect to the detected at least one improper resource access.

11. A system for cloud native discovery and protection, comprising:
a processing circuitry; and
a memory, the memory containing instructions that, when executed by the processing circuitry, configure the system to:
determine a mapping of a plurality of cloud assets to a plurality of cloud resources based on resource access data for a cloud native environment, wherein the plurality of cloud assets and the plurality of cloud resources are deployed in the cloud native environment, wherein each of the plurality of cloud assets is mapped to at least one associated cloud resource of the plurality of cloud resources, wherein the resource access data includes historical resources accessed by each of the plurality of cloud assets, wherein each cloud asset provides a cloud service;
detect at least one improper resource access based on the mapping and a cloud access security stream for the cloud native environment, wherein each of the at least one improper resource access deviates from the mapping; and
perform at least one mitigation action with respect to the detected at least one improper resource access.

12. The system of claim 11, wherein the mapping further indicates credentials used for accessing the plurality of cloud resources by each of the plurality of cloud assets, wherein the at least one improper resource access includes at least one deviation from the mapping with respect to the credentials.

13. The system of claim 11, wherein the at least one improper resource access includes a first cloud asset of the plurality of cloud assets accessing a first cloud resource of the plurality of cloud resources, wherein the first cloud asset is not mapped to the first cloud resource.

14. The system of claim 11, wherein the at least one improper resource access includes an unknown cloud asset accessing one of the plurality of cloud resources, wherein the unknown cloud asset is not among the plurality of cloud assets.

15. The system of claim 11, wherein the system is further configured to:
   determine, based on the resource access data, an improperly configured cloud asset of the plurality of cloud assets, wherein the improperly configured cloud asset is configured to access an unnecessary cloud resource of the plurality of cloud resources, wherein the unnecessary cloud resource has been accessed by the improperly configured cloud asset below a threshold number of times.

16. The system of claim 15, wherein the mitigation actions further include reconfiguring the improperly configured cloud asset, wherein the reconfigured cloud asset is not configured to access the at least one unnecessary resource.

17. The system of claim 11, wherein the system is further configured to:
   detect presence of at least one set of unnecessary credentials in the cloud native environment, wherein the at least one improper resource access includes the presence of the at least one set of unnecessary credentials, wherein the at least one set of unnecessary credentials includes at least one of: a set of credentials stored in a user folder, a set of credentials that has not been used in at least a threshold period of time, and a set of credentials stored by a user who is not authorized to store credentials.

18. The system of claim 11, wherein the system is further configured to:
   obtain the resource access data, wherein obtaining the resource access data includes at least one of: retrieving a list of permissions for each of the plurality of cloud assets, querying a metadata application programming interface for credentials used by the plurality of cloud assets, and retrieving historical authentication information from at least one firewall deployed in the cloud native environment.

19. The system of claim 11, wherein the cloud access security stream includes at least one of: a plurality of Internet Protocol addresses of entities accessing each of the plurality of cloud resources, credentials used by each of the entities to access the plurality of cloud resources, and a plurality of authentication requests.

* * * * *